US009343187B2

(12) United States Patent
Ales et al.

(10) Patent No.: US 9,343,187 B2
(45) Date of Patent: May 17, 2016

(54) COMPACT NUCLEAR REACTOR WITH INTEGRAL STEAM GENERATOR

(75) Inventors: Mathew W. Ales, Forest, VA (US); Robert T. Fortino, Canton, OH (US); Nick Idvorian, Kitchener (CA)

(73) Assignees: BWXT Nuclear Energy, Inc., Charlotte, NC (US); BWXT Foreign Holdings, LLC, Charlotte, NC (US); BWXT Canada Ltd., Cambridge, Ontario (CA)

(*) Notice: Subject to any disclaimer, the term of this patent is extended or adjusted under 35 U.S.C. 154(b) by 1195 days.

(21) Appl. No.: 12/891,317

(22) Filed: Sep. 27, 2010

(65) Prior Publication Data

US 2014/0321598 A1    Oct. 30, 2014

(51) Int. Cl.
*G21C 15/00* (2006.01)
*G21C 1/32* (2006.01)

(52) U.S. Cl.
CPC ..................... *G21C 1/326* (2013.01)

(58) Field of Classification Search
CPC ............................. G21C 1/326; G21C 15/22
USPC ................. 376/352, 373, 402, 405, 361, 403; 165/81, 82, 154, 168, 183
See application file for complete search history.

(56) References Cited

U.S. PATENT DOCUMENTS

| 596,330 | A | * | 12/1897 | Maiche | .......................... | 165/164 |
| 2,982,713 | A | * | 5/1961 | North, Jr. et al. | ............. | 376/397 |
| 3,150,051 | A |  | 9/1964 | Ammon |  |  |
| 3,165,449 | A |  | 1/1965 | Bradley |  |  |
| 3,547,084 | A |  | 12/1970 | Sprague |  |  |
| 3,888,734 | A |  | 6/1975 | Juric |  |  |
| 3,915,654 | A |  | 10/1975 | Oni et al. |  |  |
| 3,941,187 | A |  | 3/1976 | Jabsen et al. |  |  |
| 3,991,720 | A | * | 11/1976 | Byerley | .......................... | 122/32 |

(Continued)

FOREIGN PATENT DOCUMENTS

| CA | 674542 A | 11/1963 |
| CN | 85101411 A | 1/1987 |

(Continued)

OTHER PUBLICATIONS

Office Action for Taiwanese Application No. 100134639, dated May 4, 2015.

(Continued)

*Primary Examiner* — Jack W Keith
*Assistant Examiner* — Sharon M Davis
(74) *Attorney, Agent, or Firm* — Nelson Mullins Riley & Scarborough, LLP (57) ABSTRACT

In an illustrative embodiment, a pressurized water nuclear reactor (PWR) includes a pressure vessel (12, 14, 16), a nuclear reactor core (10) disposed in the pressure vessel, and a vertically oriented hollow central riser (36) disposed above the nuclear reactor core inside the pressure vessel. A once-through steam generator (OTSG) (30) disposed in the pressure vessel includes vertical tubes (32) arranged in an annular volume defined by the central riser and the pressure vessel. The OTSG further includes a fluid flow volume surrounding the vertical tubes and having a feedwater inlet (50) and a steam outlet (52). The PWR has an operating state in which feedwater injected into the fluid flow volume at the feedwater inlet is converted to steam by heat emanating from primary coolant flowing inside the tubes of the OTSG, and the steam is discharged from the fluid flow volume at the steam outlet.

13 Claims, 5 Drawing Sheets

(56) References Cited

U.S. PATENT DOCUMENTS

| | | | |
|---|---|---|---|
| 4,002,936 A | | 1/1977 | Laing |
| 4,057,467 A | * | 11/1977 | Kostrzewa .................... 376/406 |
| 4,072,563 A | * | 2/1978 | McDonald et al. ........... 376/406 |
| 4,172,492 A | * | 10/1979 | Abell et al. ................... 165/11.2 |
| 4,257,356 A | * | 3/1981 | Minnick ........................ 122/32 |
| 4,716,013 A | | 12/1987 | Veronesi et al. |
| 4,859,407 A | * | 8/1989 | Nylund ......................... 376/446 |
| 5,089,218 A | * | 2/1992 | Gardner et al. ............... 376/406 |
| 5,104,611 A | * | 4/1992 | Woods et al. ................. 376/203 |
| 5,114,667 A | | 5/1992 | Hayashi et al. |
| 5,319,689 A | | 6/1994 | Challberg |
| 5,335,252 A | * | 8/1994 | Kaufman ....................... 376/402 |
| 5,380,502 A | * | 1/1995 | Murphy et al. ............... 422/652 |
| 6,259,760 B1 | | 7/2001 | Carelli et al. |
| 6,357,114 B1 | | 3/2002 | Tang et al. |
| 6,498,827 B1 | | 12/2002 | Klarner |
| 6,772,832 B2 | | 8/2004 | Schneider |
| 6,795,518 B1 | | 9/2004 | Conway et al. |
| 6,810,099 B2 | | 10/2004 | Nakamaru et al. |
| 6,810,101 B2 | | 10/2004 | Klarner |
| 6,813,328 B2 | | 11/2004 | Kitch et al. |
| 6,840,309 B2 | * | 1/2005 | Wilson et al. ................. 165/81 |
| 6,944,255 B2 | | 9/2005 | Hattori et al. |
| 6,997,141 B2 | | 2/2006 | Sun |
| 7,120,218 B2 | | 10/2006 | Srinivasan |
| 7,154,982 B2 | | 12/2006 | Gautier et al. |
| 2005/0018806 A1 | | 1/2005 | Gautier et al. |
| 2008/0115508 A1 | | 5/2008 | Kotzot et al. |
| 2011/0176938 A1 | * | 7/2011 | DeFilippis et al. ........... 417/151 |
| 2011/0194664 A1 | | 8/2011 | Yokoyama et al. |

FOREIGN PATENT DOCUMENTS

| | | |
|---|---|---|
| JP | 51-053196 A | 5/1976 |
| JP | 54-096603 A | 7/1979 |
| JP | 59-000995 U | 1/1984 |
| JP | 06-043275 A | 2/1994 |
| JP | 2003-004885 A | 1/2003 |
| JP | 2005-510744 A | 4/2005 |
| TW | 236026 B | 12/1994 |

OTHER PUBLICATIONS

"The Iris Spool-Type Reactor Coolant Pump" by J. M. Kujawski, D. M. Kitch and L E Conway; Proceedings of ICONE10, 10th International Conference on Nuclear Engineering, Arlington, VA, Apr. 14-18, 2002.

International Search Report and Written Opinion for PCT/US2011/050741 dated Dec. 30, 2011.

Chinese Office Action for Application No. 201180004814.7 dated Jan. 29, 2015.

Japanese Office Action for Application No. 2013-531614 dated Feb. 23, 2015.

Chapter 48—Nuclear Steam Generators (pp. 48-1 to 48-15); Steam Its Generation and Use, 41st Edition, 2005.

\* cited by examiner

Section D-D

COMPACT NUCLEAR REACTOR WITH INTEGRAL STEAM GENERATOR

BACKGROUND

The following relates to the nuclear reactor arts, steam generator and steam generation arts, electrical power generation arts, and related arts.

Compact nuclear reactors are known for maritime and land-based power generation applications and for other applications. In some such nuclear reactors, an integral steam generator is located inside the reactor pressure vessel, which has advantages such as compactness, reduced likelihood of a severe loss of coolant accident (LOCA) event due to the reduced number and/or size of pressure vessel penetrations, retention of the radioactive primary coolant entirely within the reactor pressure vessel, and so forth.

Disclosed herein are further improvements that provide reduced cost, simplified manufacturing, and other benefits that will become apparent to the skilled artisan upon reading the following.

BRIEF SUMMARY

In one aspect of the disclosure, an apparatus comprises: a generally cylindrical pressure vessel defining a cylinder axis; a nuclear reactor core disposed in the generally cylindrical pressure vessel; a central riser disposed coaxially inside the generally cylindrical pressure vessel, the central riser being hollow and having a bottom end proximate to the nuclear reactor core to receive primary coolant heated by the nuclear reactor core, the central riser having a top end distal from the nuclear reactor core; and a once-through steam generator (OTSG) comprising tubes arranged parallel with the cylinder axis in an annular volume defined between the central riser and the generally cylindrical pressure vessel, primary coolant discharged from the top end of the central riser flowing inside the tubes toward the nuclear reactor core, the OTSG further including a fluid flow volume having a feedwater inlet and a steam outlet wherein fluid injected into the fluid flow volume at the feedwater inlet and discharged from the fluid flow volume at the steam outlet flows outside the tubes in a direction generally opposite flow of primary coolant inside the tubes.

In another aspect of the disclosure, an apparatus comprises: a pressurized water nuclear reactor (PWR) including a pressure vessel, a nuclear reactor core disposed in the pressure vessel, and a vertically oriented hollow central riser disposed above the nuclear reactor core inside the pressure vessel; and a once-through steam generator (OTSG) disposed in the pressure vessel of the PWR, the OTSG including vertical tubes arranged in at least one of (i) the central riser and (ii) an annular volume defined by the central riser and the pressure vessel, the OTSG further including a fluid flow volume surrounding the vertical tubes; wherein the PWR has an operating state in which feedwater injected into the fluid flow volume at a feedwater inlet is converted to steam by heat emanating from primary coolant flowing inside the tubes of the OTSG, and the steam is discharged from the fluid flow volume at a steam outlet.

In another aspect of the disclosure, a method comprises: constructing a once-through steam generator (OTSG), the constructing including mounting tubes of the OTSG under axial tension; and operating the OTSG at an elevated temperature at which the tubes are under axial compression.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

DETAILED DESCRIPTION OF THE PREFERRED EMBODIMENTS

Figure 1:
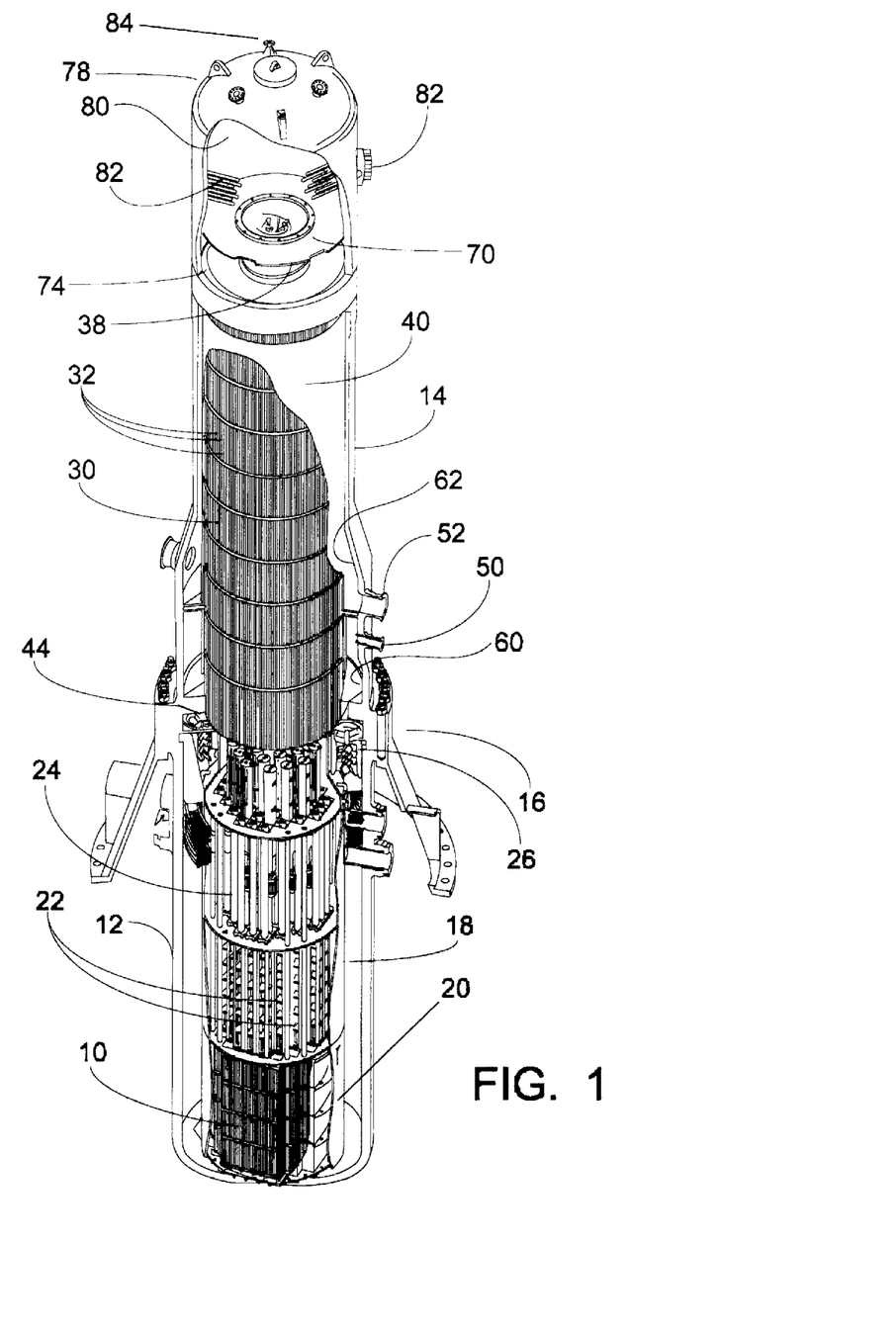
FIG. 1 diagrammatically shows a perspective partial-sectional view a nuclear reactor including an integral steam generator as disclosed herein.

With reference to FIG. 1, a perspective partial-sectional view an illustrative nuclear reactor is shown. A nuclear reactor core 10 is disposed inside a generally cylindrical pressure vessel. In the illustrative embodiment the pressure vessel includes a lower pressure vessel portion or section 12 housing the nuclear reactor core 10, an upper vessel portion or section 14, and mid-flange region 16. This is merely an illustrative configuration, and the pressure vessel can in general be constructed of as few as a single portion or section, or two portions or sections, three portions or sections (as illustrated), four portions or sections (for example including a fourth upper "cap" portion or section separate from the upper portion or section), or so forth. The pressure vessel 12, 14, 16 contains primary coolant, which in the illustrative case of a light water reactor is water ($H_2O$), optionally including other additives for reactivity control, such as a boron compound (e.g., "borated water"). In other contemplated embodiments the primary coolant may be another fluid, such as heavy water ($D_2O$). The primary coolant fills most or all of the volume of the pressure vessel 12, 14, 16. A reactor inlet annulus 18 surrounds the reactor core 10 to enable primary coolant to flow to the reactor core 10. Optional shielding or shrouding 20 disposed in the reactor inlet annulus 18 provides additional radiation shielding from the reactor core 10. The illustrative reactor is a pressurized water reactor (PWR) in which the primary coolant is sub-cooled light water maintained under an elevated pressure at a temperature below the boiling point (saturation temperature) at the operating pressure; however, a boiling water reactor (BWR) in which the primary coolant operates at the saturation temperature at an elevated pressure, or another reactor configuration such as a configuration employing heavy water, is also contemplated.

Reactor control is provided by upper internal neutron-absorbing control rods 22 and a control rod drive mechanism (CRDM) 24 that is configured to controllably insert and withdraw the control rods into and out of the nuclear reactor core 10. Diagrammatic FIG. 1 only identifies two illustrative control rods 22; however, in some embodiments the control rods may number in the dozens or hundreds, with insertion points spatially distributed across the reactor core area to collectively provide uniform reaction control. The CRDM 24 may be divided into multiple units (details not illustrated), each controlling one or more control rods. For example, a plurality of control rods may be operatively coupled with a single CRDM unit via a connecting rod/spider assembly or other suitable coupling (details not illustrated). In some illustrative embodiments, a CRDM unit includes a motor driving a lead screw operatively connected with control rods via a connecting rod/spider assembly, such that motor operation causes linear translation of the assembly including the lead screw, connecting rod, spider, and control rods. Such CRDM units provide fine control of the precise insertion of the control rods into the reactor core 10 via the lead screw, and hence are suitable for "gray rod" operation providing fine incremental reaction control. In some illustrative embodiments, a CRDM unit may comprise a lifting piston that lifts an assembly including the connecting rod, spider, and control rods out of the reactor core 10, and during a SCRAM removes the lifting force to allow the control rods to fall into the reactor core 10 by gravity and optional hydraulic pressure force(s). Such CRDM units are suitably used for "shutdown rod" operation, as part of the reactor safety system. In yet other illustrative embodiments, the gray rod and shutdown rod functionality is integrated into a single CRDM unit, for example using a separable ball nut coupling with a lead screw such that the CRDM unit normally provides gray rod functionality but during a SCRAM the ball nut separates to release the control rods into the reactor core 10. Some further illustrative embodiments of CRDM units are set forth in application Ser. No. 12/722,662 titled "Control Rod Drive Mechanism for Nuclear Reactor" filed Mar. 12, 2010 and related application Ser. No. 12/722,696 titled "Control Rod Drive Mechanism For Nuclear Reactor" filed Mar. 12, 2010 are both incorporated herein by reference in their entireties. These applications disclose CRDM units providing gray/shutdown rod functionality, in which the connection between the motor and the lead screw is not releasable, but rather a separate latch is provided between the lead screw and the connecting rod in order to effectuate SCRAM. In these alternative configurations the lead screw does not SCRAM, but rather only the unlatched connecting rod and control rod SCRAM together toward the reactor core while the lead screw remains engaged with the motor.

The diagrammatically illustrated CRDM 24 may include one or more CRDM units including various combinations of CRDM units of the described types or other CRDM unit configurations providing gray and/or shutdown rod functionality. The illustrative CRDM 24 is an internal CRDM in which all mechanical and electromagnetomotive components, including the motor, lead screw, connecting rod, and so forth are disposed inside the pressure vessel 12, 14, 16, with only electrical wires, hydraulic lines, or other power or control leads connecting with these components. In other contemplated embodiments, the CRDM may employ external CRDM units in which the motor is mounted outside the pressure vessel, for example above or below.

With continuing reference to FIG. 1, the primary coolant may be circulated naturally, due to natural convection set up by heating due of the primary coolant in the vicinity of the operating nuclear reactor core 10. Additionally or alternatively, the primary coolant circulation may be driven or assisted by optional reactor coolant pumps 26. The diagrammatically illustrated coolant pumps 26 are internal pumps having rotor and stator elements both located inside the pressure vessel 12, 14, 16. Alternatively, an external pump can be employed, for example having an external stator and a rotor coupled with the pressure vessel volume via a suitable conduit or tube, or the circulation pumps may be omitted entirely, as per natural convection reactor embodiments.

Figure 2:
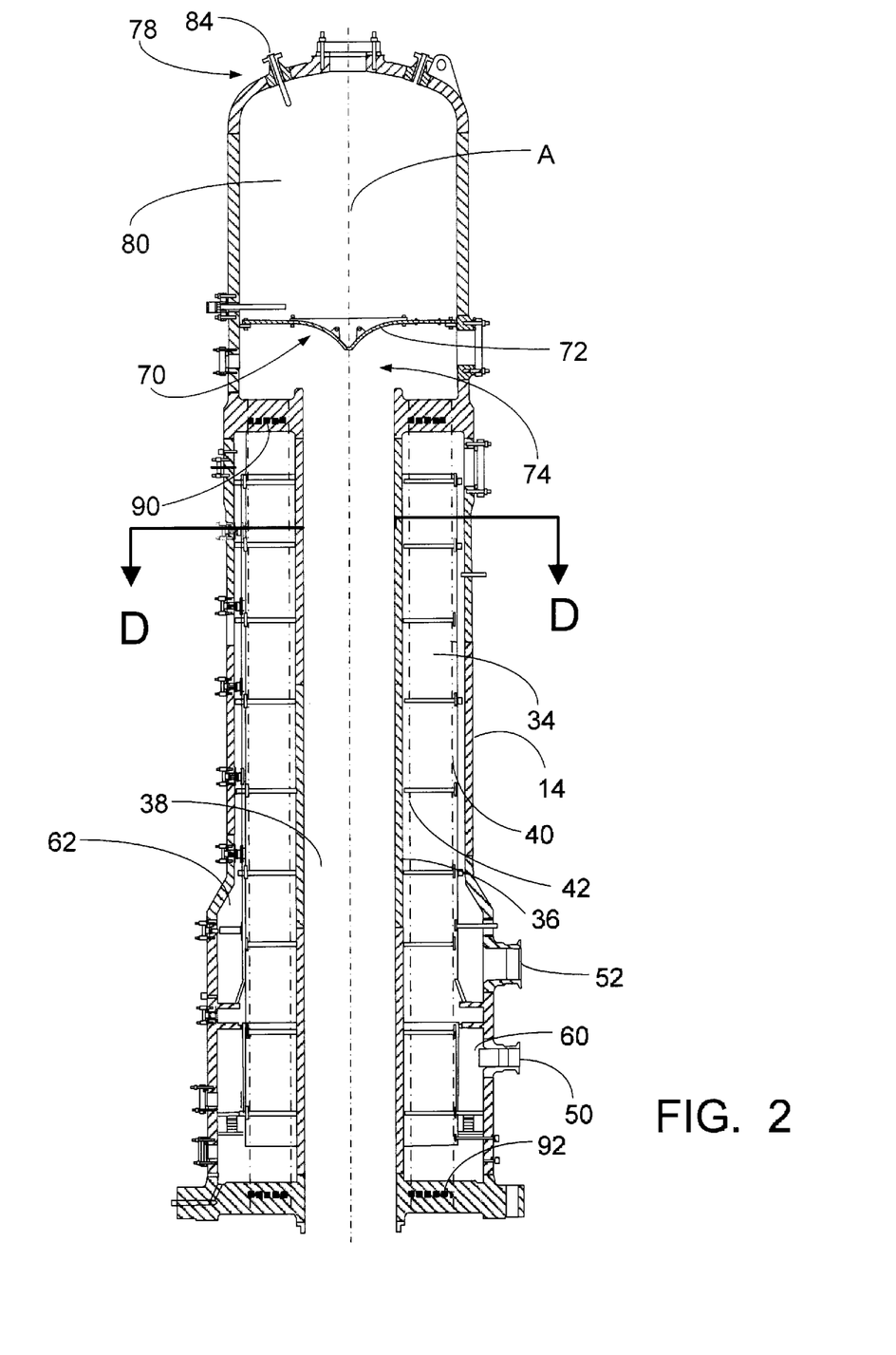
FIG. 2 diagrammatically shows a side sectional view of the upper vessel section of the nuclear reactor of FIG. 1 with the tubes of the steam generator omitted to emphasize the downcomer volume.
Figure 3:
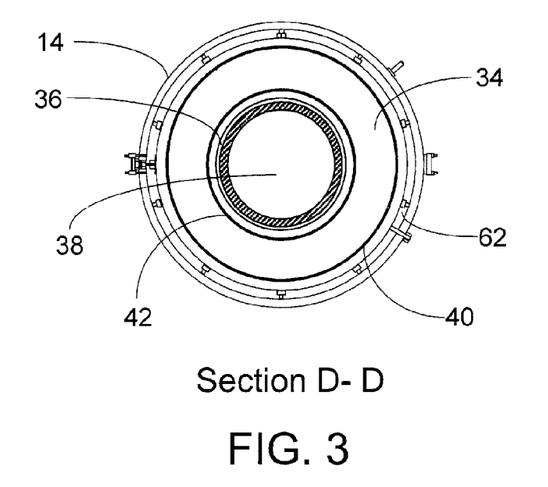
FIG. 3 diagrammatically shows Section D-D indicated in FIG. 2.

The nuclear reactor is further described with continuing reference to FIG. 1 and with further reference to FIGS. 2 and 3. FIG. 2 illustrates a side sectional view of the upper vessel 14 and selected components therein, while FIG. 3 shows Section D-D indicated in FIG. 2. As seen in FIG. 1, the illustrative nuclear reactor is an integral nuclear reactor, by which it is meant that a steam generator 30 is integrated inside the pressure vessel 12, 14, 16. In the illustrative example, the pressure vessel 12, 14, 16 is generally cylindrical and defines a cylinder axis A (labeled only in FIG. 2). The steam generator 30 is a straight-tube once-through steam generator (OTSG) 30 disposed in the upper vessel 14. The OTSG 30 includes straight tubes 32 arranged vertically in parallel with the cylinder axis A in an annular "downcomer" volume 34 defined between: (i) a hollow central riser 36 disposed coaxially in the upper portion 14 of the generally cylindrical pressure vessel, and (ii) the upper portion 14 of the generally cylindrical pressure vessel. The hollow central riser 36 defines a central riser flow path 38 inside the central riser 36. The OTSG 30 also includes an outer shroud 40 surrounding the tubes 32 disposed in the downcomer volume 34, and an inner shroud 42 disposed between the central riser 36 and the tubes 32. (Note that in FIGS. 2 and 3, the OTSG shrouds 40, 42 are shown and labeled, but the tubes 32 are omitted so as to more clearly show the annular downcomer volume 34 in FIGS. 2 and 3).

The primary coolant flow path in the illustrative reactor is as follows. The central riser 36 has a bottom end proximate to the nuclear reactor core 10 to receive primary coolant heated by the nuclear reactor core 10, and a top end distal from the nuclear reactor core 10. Primary coolant heated by the nuclear reactor core 10 flows upward through the central riser flow path 38 inside the central riser 36. At the top of the central riser 36 the primary coolant flow turns 180° (that is, from flowing generally upward to flowing generally downward). The primary coolant enters the tubes 32 of the OTSG 30 and flows downward through the tubes 32. The primary coolant is discharged from the lower ends of the tubes 32 into a primary outlet plenum 44, which passes the primary coolant flow back to the reactor inlet annulus 18 and back to the reactor core 10.

Figure 4:
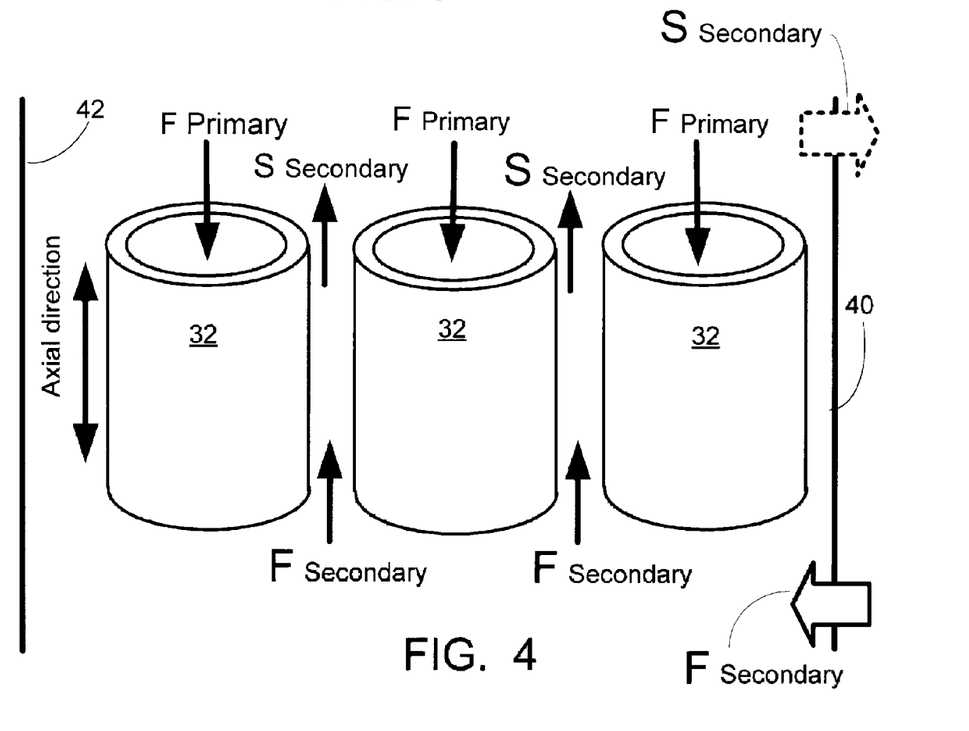
FIG. 4 diagrammatically shows flow of the primary and secondary coolant fluids in the integral steam generator of FIG. 1.

With continuing reference to FIGS. 1-3 and with further reference to FIG. 4, the outer and inner shrouds 40, 42 of the OTSG 30 define a fluid flow volume of the OTSG 30 between the shrouds 40, 42. This fluid flow volume surrounds the tubes 32, and has a feedwater inlet 50 and a steam outlet 52. Note that although a single inlet 50 and single outlet 52 are illustrated, in other embodiments there may be multiple inlets and/or multiple outlets, to provide redundancy and/or improved radial symmetry in the plane transverse to the axis A. Fluid (e.g., feedwater) is injected into the fluid flow volume at the feedwater inlet 50 and is discharged from the fluid flow volume (e.g., as steam) at the steam outlet 52. While in the fluid flow volume, the fluid flows outside the tubes 32 of the OTSG 30 in a generally upward direction generally opposite flow of primary coolant inside the tubes 32.

With continuing reference to FIGS. 1-3 and with further reference to FIG. 4, in the operating state of the illustrative PWR, feedwater injected into the fluid flow volume of the OTSG 30 at the feedwater inlet 50 is converted to steam by heat emanating from primary coolant flowing inside the tubes 32 of the OTSG 30, and the steam is discharged from the fluid flow volume at a steam outlet 52. This is diagrammatically shown in FIG. 4, which shows portions of three illustrative tubes 32 carrying downward primary coolant flow ($F_{primary}$). The fluid flow volume of the OTSG 30 is diagrammatically shown in FIG. 4 by indication of portions of the outer and inner shrouds 40, 42 that define the fluid flow volume of the OTSG 30. To facilitate correlation with FIGS. 1-3, the axial direction corresponding to the axis A of the generally cylindrical pressure vessel is also indicated in FIG. 4. The fluid flowing in the fluid flow volume of the OTSG 30 is sometimes referred to herein as "secondary" coolant, and the generally upward "counter" flow of the secondary coolant in the fluid flow volume of the OTSG 30 is indicated as secondary coolant flow ($F_{secondary}$) in diagrammatic FIG. 4. During the upward flow, heat emanating from the primary coolant flow $F_{primary}$ transfers to the secondary coolant flow $F_{secondary}$, causing the secondary coolant to heat until it is converted to secondary coolant flow having the form of steam flow ($S_{secondary}$). (The steam flow $S_{secondary}$ is also diagrammatically indicated in FIG. 4 by using dotted arrows). Although not illustrated, the steam flow $S_{secondary}$ exiting the steam outlet 52 suitably serves as working steam that flows to and operates a turbine or other steam-operated device.

In the illustrative embodiment, the fluid flow volume of the OTSG 30 is defined by the outer and inner shrouds 40, 42 that are separate from the central riser 36 and the upper portion 14 of the pressure vessel. Advantageously, this enables the OTSG 30 to be constructed as a unit including the tubes 32 and surrounding shrouds 40, 42, and to then be installed as a unit in the upper portion 14 of the pressure vessel. However, it is also contemplated for the inner shroud to be embodied as an outer surface of the central riser 36, and/or for the outer shroud to be embodied as an inner surface of the upper portion 14 of the pressure vessel.

In embodiments which include the outer shroud 40 which is separate from the upper pressure vessel portion 14 (as in the illustrative embodiment), an annular space between the outer shroud 40 and the pressure vessel 14 may optionally be employed for a useful purpose. In the illustrative example, the annular space between the outer shroud 40 and the pressure vessel 14 defines a feedwater annulus 60 between an outer shroud 40 of the OTSG 30 and the pressure vessel (upper portion 14) buffers feedwater injected into the fluid flow volume at the feedwater inlet 50. Similarly, a steam annulus 62 between the outer shroud 40 of the OTSG 30 and the pressure vessel (upper portion 14) buffers steam discharged from the fluid flow volume at the steam outlet 52.

In some embodiments, the feedwater annulus and the steam annulus have equal inner diameters and equal outer diameters. In such embodiments the outer shroud and the relevant pressure vessel portion have constant diameters over the axial length of the annuluses. In the illustrative embodiment, however, the feedwater annulus 60 has a larger outer diameter than the steam annulus 62. This is obtained by increasing the diameter of the upper pressure vessel portion 14 surrounding the feedwater annulus 60 as compared with the diameter of the upper pressure vessel portion 14 surrounding the steam annulus 62. In the illustrative embodiment the diameter of the outer shroud 40 remains constant over the axial length of the annuluses 60, 62. This configuration allows a larger local inventory of water so that the time available for steam generator boil-off is relatively longer in the event of a loss-of-feedwater (LOFW) accident.

With reference to FIGS. 1 and 2, as already mentioned the flow circuit for the primary coolant includes a 180° flow reversal as the primary coolant discharges from the central riser flow path 38 inside the central riser 36 and flows into the top ends of the tubes 32 of the OTSG 30. Optionally, a flow diverter 70 is provided to facilitate this flow reversal. The illustrative flow diverter 70 is disposed in the generally cylindrical pressure vessel 14 and has a flow diverting surface 72 facing the top end of the central riser that is sloped or (as illustrated) curved to redirect primary coolant discharged from the top end of the central riser 36 toward inlets of the tubes 32 of the OTSG 30. The flow diverter 70 is spaced apart from the top of the central riser 36 by a primary inlet plenum 74.

As previously mentioned, the illustrative nuclear reactor is a pressurized water reactor (PWR) in which the primary coolant is sub-cooled and maintained under positive pressure. In some embodiments, the pressurization of the primary coolant is provided by an external pressurizer. However, in the illustrative embodiment the pressurization of the primary coolant is provided by an internal pressurizer. In this configuration, the flow diverter 72 also serves as a part of the divider plate 70 spaced apart from the top end of the central riser 36 by the aforementioned primary inlet plenum 74. The generally cylindrical pressure vessel 12, 14, 16 (and, more precisely, the upper pressure vessel portion 14) includes a sealing top portion 78 cooperating with the divider plate 70 to define an integral pressurizer volume 80 that is separated by the divider plate 70 from the remaining interior volume of the generally cylindrical pressure vessel 12, 14, 16. In the operating state of the PWR, the integral pressurizer volume 80 contains fluid (saturated primary coolant liquid and steam) at a temperature that is greater than the temperature of the primary coolant disposed in the remaining interior volume of the generally cylindrical pressure vessel 12, 14, 16. In this embodiment, the saturation temperature is maintained by pressurizer heaters 82 (shown only in FIG. 1), while pressurizer spray nozzles 84 provide a mechanism for reducing the pressure by condensing some of the steam vapor in volume 80. The divider plate 70 suitably includes openings (not shown) providing hydraulic fluid communication between the integral pressurizer volume 80 and the remaining interior volume of the generally cylindrical pressure vessel 12, 14, 16. This hydraulic fluid communication establishes the pressure level in the remaining interior volume of the generally cylindrical pressure vessel 12, 14, 16. Since there is a temperature difference across divider plate 70 between the pressurizer volume 80 and primary inlet plenum 74, the remaining primary fluid in the interior volume of the generally cylindrical pressure vessel 12, 14, 16 is maintained at sub-cooled liquid conditions at a temperature approximately 11° C. (20° F.) less than the saturation temperature in pressurizer volume 80. This level of sub-cooled liquid prevents the primary fluid in reactor core 10 from experiencing saturated bulk boiling which has a significantly higher vapor volume fraction than sub-cooled nucleate boiling typically present in pressurized water nuclear reactor cores. This prevention of bulk boiling in a PWR core is made possible by the pressurizer (80, 82, 84, 78, and 70) and is beneficial for the integrity of the nuclear reactor fuel rods by minimizing the probability of departure from nucleate boiling (DNB) which increases the fuel pellet and fuel cladding temperatures.

Having set forth an illustrative integral PWR as an illustrative example in FIGS. 1-4, some further additional aspects and variants are set forth next.

In one illustrative quantitative example, the reactor core 10 in the operating state operates at 425 MW thermal. The hot reactor coolant water flows in a circuit, called the hot leg, which includes the space above the core flowing around the CRDM's 24. The hot leg extends up the central riser 36 to the inlet plenum 74, wherein the reactor coolant subsequently enters into the tubes 32 of the straight-tube OTSG 30 via the central riser flow path 38. The straight-tube OTSG 30 encircles the central riser 36 and includes the annular array of steam generator tubes 32 disposed in the annulus between the central riser 36 and the outer shroud 40 of the OTSG 30. An advantage of this configuration is that the central riser 36 is a high pressure component separating the high pressure reactor primary coolant at 1900 psia (in this illustrative quantitative embodiment) from the lower pressure secondary coolant which in this example is at 825 psia. The use of an internal pressure part via the central riser 36 yields a compact and efficient design since the primary pressure boundary is internal to the steam generator 30 and serves the dual use as a riser defining the flow path 38 for the hot leg. One design consideration is that there is differential thermal expansion between central riser 36, the tubes 32, and the upper vessel 14. The differential expansion is further complicated by the feedwater annulus 60 containing feedwater at a substantially lower temperature than the steam in the steam annulus 62, which results in a range of temperatures in the upper vessel 14, causing additional thermal stress.

One approach for mitigating the effect of these differential stresses is to balance the stresses over the operational and non-operational range of conditions of the steam generator. In one illustrative example, the tubes 32 are made of an austenitic nickel-chromium-based alloy, such as Inconel™ 690, and the tubes 32 are secured in a support made of steel. The support includes an upper tubesheet 90 and a lower tubesheet 92 (diagrammatically indicated in FIG. 2) In general, the austenitic nickel-chromium-based alloy will have a higher coefficient of thermal expansion than the steel. The balancing of the stresses over the operational and non-operational range of conditions is suitably accomplished by pre-stressing the Inconel™ 690 steam generator tubes 32 by expanding the tubes 32 into mating holes of the upper and lower tubesheets 90, 92. This expansion draws the tubes into tension via the Poisson effect. In general, the concept is that in the operating state of the nuclear reactor the primary coolant flowing in the tubes 32 of the OTSG 30 is at a relatively high temperature, for example a temperature of at least 500° C., and the tubes 32 of the OTSG 30 are designed to be under axial compression in this operating state at high temperature. On the other hand, the tubes 32 of the OTSG 30 are designed to be under axial tension in a non-operating state of the nuclear reactor in which the tubes 32 are at a substantially lower temperature such as room temperature, for example suitably quantified as a temperature of less than 100° C. The balancing of the stresses over the operational and non-operational range is achieved by pre-stressing the tubes 32 to be in axial tension at room temperature (e.g., at less than 100° C. in some embodiments), so that the differential thermal expansion between the Inconel™ 690 steam generator tubes 32 and the steel of the central riser 36 and vessel 14 causes the tubes to transition from axial tension to axial compression as the temperature is raised to the operating temperature, e.g. at least 500° C. in some embodiments. These differential thermal stresses among components 14, 32, and 36 are set up by common connection of the components at the tubesheet supports 90, 92 is also optionally reduced by having the feedwater nozzle 50 positioned low in the pressure vessel leaving a longer steam outlet annulus 62 to blanket the vessel with high temperature outlet steam, and by reducing axial length of the feedwater annulus 60 by employing a larger radius for the feedwater annulus 60.

Figure 5:
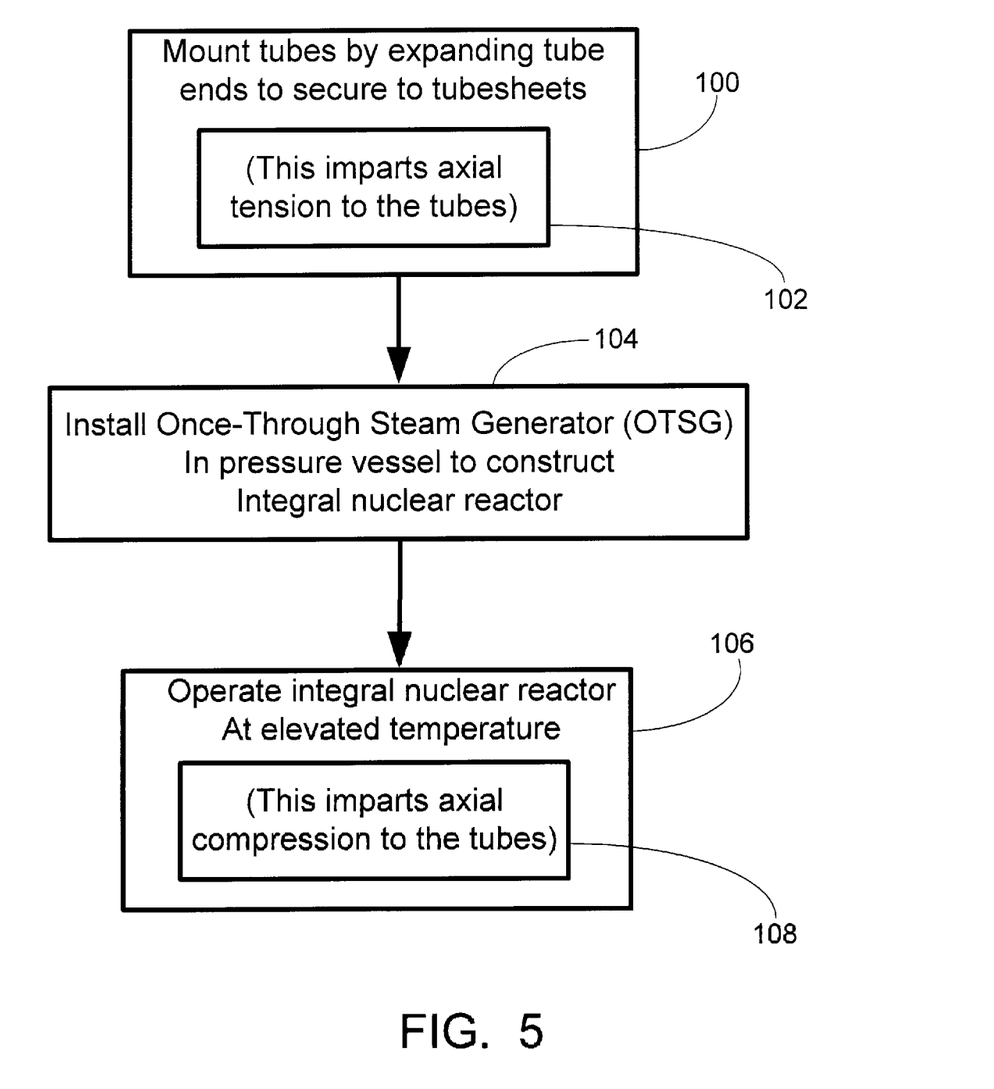
FIG. 5 diagrammatically shows an illustrative process for manufacturing and deploying the integral steam generator of FIG. 1.

With brief reference to FIG. 5, a manufacturing sequence to prestress the tubes 32 to place them into axial tension is further described. In an operation 100, the tubes 32 are mounted in the tubesheets 90, 92 of the OTSG frame or support by expanding the tube ends to secure them to the tubesheets 90, 92. A consequential operation 102 is that this imparts axial tension to the tubes 32. In an operation 104, the OTSG 30 including the prestressed tubes 32 is installed in the pressure vessel 12, 14, 16 to construct the integral PWR of FIGS. 1-4. In an operation 106, the integral PWR is started up and brought to its operating state which has the effect of raising the temperature the primary coolant flowing in the tubes 32 of the OTSG 30 to an operating temperature of (in the illustrative example) at least 500° C. A consequential operation 108 is that this imparts axial compression to the tubes 32 due to the relatively higher coefficient of thermal expansion of the austenitic nickel-chromium-based alloy of the tubes 32 as compared with the steel of the central riser 36 and vessel 14 connected via tubesheets 90, 92.

In some embodiments, in the operating state the OTSG 30 defines an integral economizer that heats feedwater injected into the fluid flow volume at the feedwater inlet 50 to a temperature at or below a boiling point of the feedwater. In such embodiments, the straight-tube OTSG 30 is an integral economizer (IEOTSG) design since the feedwater is heated by flow outside of the tubes 32. Feedwater enters through the feedwater nozzles 50, distributes throughout the feedwater annulus 60, and enters the tubes 32 via a gap or other passage (not shown) between the bundle shroud 40 and the lower tubesheet 92. In the operating mode, feedwater flows outside of the tubes 32 and there is forced convection heat transfer from the primary coolant flow to the feedwater flow followed by subcooled and saturated boiling to form the steam flow. Once the critical heat flux is reached at approximately 95% steam quality, the steam goes through a transition to stable film boiling followed by dryout at 100% steam quality. Thereafter in the tube bundle, the forced convection to steam raises the temperature to superheated conditions at which the steam exits the steam generator via the steam outlet annulus 62 and the steam outlet nozzle 52. The superheated steam does not require moisture separators before the steam is delivered to the steam turbine (although it is contemplated to include moisture separators in some embodiments).

Some further aspects of the integral pressurizer are next described. The pressurizer controls the pressure of the primary coolant via the pressurizer heaters 82 and the pressurizer spray nozzles 84. To increase system pressure, the heaters 82 are turned on by a reactor control system (not shown). To decrease pressure, the spray nozzles 84 inject cold leg water from the top of the reactor inlet annulus 18 on the discharge side of the reactor coolant pumps 26 via a small external line (not shown). The pressurizer volume 80 is formed by a divider plate 70 which separates the space between the primary inlet plenum 74 and the pressurizer volume 80. The divider plate 70 optionally also serves as a flow diverter by including a perforated cylinder 124 (FIG. 6, top of divider plate not shown) or a cone shaped flow diverter surface 72 (FIG. 2) or other curved or slanted surface which aids in the turning of the flow in the primary coolant in the inlet plenum 74 before it enters the upper ends of the tubes 32 of the OTSG 30 setting up downward flow inside the tubes 30. The illustrative pressurizer including the pressurizer volume 80 and pressure control structures 82, 84 advantageously is a fully integral pressurizer (that is, is part of the pressure vessel 12, 14, 16) and advantageously has no pass-throughs for external CRDM's or other components.

The central riser 36 forms a path 38 for the primary coolant flow leaving the reactor core 10 to reach the primary inlet plenum 74 of the steam generator 30. In this embodiment there is no horizontal run of piping for this purpose. As a result, if the reactor is operated in a natural circulation mode with the reactor coolant pumps 26 turned off (as may occur during a malfunction or loss of electrical power causing the pumps 26 to stop operating), the hot rising primary coolant is only impeded by the upper internals (e.g., the CRDM's 24). This flow resistance is not large compared to the flow resistance of the core 10 and the steam generator tubes 32 because the flow area is relatively large. The flow resistance of the central riser 36 is also a relatively small percentage of the total because of the large diameter of the path 38.

In some existing nuclear steam supply systems, after a loss of coolant accident (LOCA) steam and non-condensable gases can collect at the high points of the reactor coolant pipes, and can inhibit the natural circulation loop between the reactor core and the steam generators. Advantageously, the straight-tube OTSG 30 with integral pressurizer volume 80 disclosed herein automatically removes non-condensable gases from the primary coolant circulation loop since there is only one high point at the top of the pressurizer volume 80. Buoyancy causes the non-condensable gases and vapor to go to the top of the pressurizer volume 80, where these gases and vapor do not interfere with the natural circulation loop.

Another advantage of the disclosed straight-tube OTSG 30 is that it can optionally operate in multiple modes to remove decay heat from the reactor core 10. Starting with the normal operating state, if the reactor coolant pumps 26 stop operating, then the primary coolant water continues to circulate, albeit now via natural circulation, through the core 10 and through the steam generator tubes 32. As long as there is feedwater supplied to the inlet 50 of the steam generator 30, there is a large tube surface area to remove radioactive fission product heat from the core 10. If the primary coolant level falls below the level of the primary inlet plenum 74 during a LOCA, then the straight-tube OTSG 30 can operate as a condenser. In this mode, steam from boiling water in the reactor core 10 rises to fill the primary inlet plenum 74 and the pressurizer volume 80. The lower temperature water and steam on the secondary side (that is, in the fluid flow volume defined outside the tubes 32 by the shrouds 40, 42) causes condensation inside the steam generator tubes 30. By gravity alone, the condensate flows out of the steam generator tubes 32 into the primary outlet plenum 44 where it is returned to the core 10.

In the straight-tube OTSG 30, the primary coolant pressure is inside the tubes 32. The primary coolant is at a substantially higher pressure than the secondary coolant flowing through the fluid flow volume defined outside the tubes 32 by the shrouds 40, 42. In some embodiments, in the operating state of the nuclear reactor the primary coolant flowing inside the tubes 32 is at a pressure that is at least twice a pressure of the secondary fluid (feedwater or steam) in the fluid flow volume. This enables the use of a thinner tube wall in tension. In contrast, if the primary coolant flows outside the tubes then the tube is in compression and a thicker tube wall is generally required. Some analyses have indicated that the tube wall in the tension design of the present OTSG embodiments can be made about one-half as thick as the tube wall thickness required for tubes placed in compression (for comparable tube diameter).

The use of thinner tube walls translates into the OTSG 30 being substantially lighter and including substantially less Inconel™ 690 or other nickel-chromium-based alloy material used for the tubes 32. The weight saving of the straight-tube OTSG 30 is advantageous for an integral nuclear reactor. For example, in the illustrative embodiment of FIGS. 1-3, during refueling the core 10 is accessed by removing the steam generator 30. This entails disconnecting the OTSG 30 from the lower pressure vessel portion 12 via the mid-flange 16. The lightweight straight-tube OTSG 30 advantageously reduces the requisite size of the containment structure crane used for lifting the steam generator 30 off to the side during refueling.

The straight-tube OTSG 30 also has service and maintenance advantages. Manways are readily provided proximate to the pressurizer volume 80 and the primary inlet plenum 74 to provide service access. Inspection of the tubes 32 can be performed during a plant outage via the primary inlet plenum 74 without removing the steam generator 30 from the pressure vessel. Eddy current inspection thusly performed can reveal tube thinning and tube cracks. If tube plugging is indicated by such inspection, the steam generator 30 can be removed during the outage and tube plugs can be installed at the lower tubesheet 92 and the upper tubesheet 90. In another approach, both tube inspection and tube plugging can be done during refueling when the steam generator 30 is placed off to the side of the reactor. In this case, there is easy access from the bottom for tube inspection and plugging.

Figure 6:
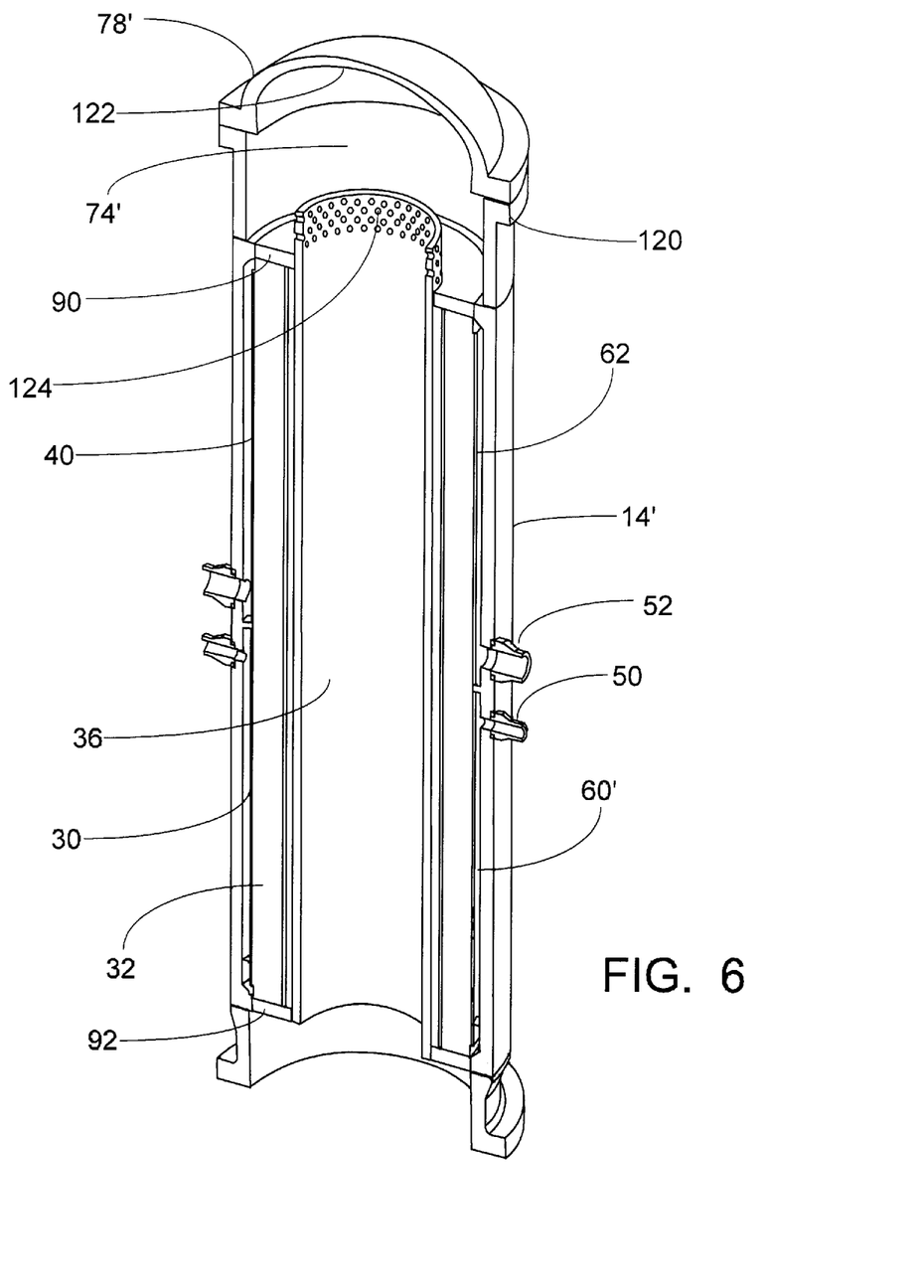
FIG. 6 diagrammatically illustrates the upper pressure vessel portion of a variant embodiment.

With reference to FIG. 6, a variant embodiment is described. This variant embodiment includes the IEOTSG 30 with tubes 32 mounted in upper and lower tubesheets 90, 92. In this variant embodiment, a modified upper pressure vessel portion 14' differs from the upper pressure vessel portion 14 in that it does not have a larger diameter to provide a feedwater annulus with larger outer diameter as compared with the steam annulus. Rather, a feedwater annulus 60' connected with the feedwater inlet 50 in the variant embodiment of FIG. 6 is of the same outer diameter as the steam annulus 62 that is connected with the steam outlet 52. The modified upper pressure vessel portion 14' also differs from the upper pressure vessel portion 14 in that it does not include the integral sealing top portion 78. Rather, a separate sealing top portion 78' is provided which is secured to the modified upper pressure vessel portion 14' by an upper flange 120. Still further, the variant embodiment also does not include an integral pressurizer volume or the diverter plate 70. Rather, the sealing top portion 78' defines a modified primary inlet plenum 74' (but does not define a pressurizer volume), and the sealing top portion 78' includes a curved surface 122 that cooperates with cylinder openings 124 at the top of the central riser 36 to perform the primary coolant flow diversion functionality.

As the pressurizer volume 80 of the embodiment of FIGS. 1-3 is omitted in the variant embodiment of FIG. 6, primary coolant pressurization for the embodiment of FIG. 6 is suitably provided by self-pressurization. In this approach, steam vapor from the reactor core collects at the top of the steam generator vessel, that is, in the primary inlet plenum 74'. The compressibility of the vapor filled dome volume 74' regulates the primary coolant pressure. To increase power, the feedwater flow into the feedwater inlet 50 is increased which increases the boiling lengths in the tubes 32. The reactor core 10 follows the load demand by increasing power via a negative moderator coefficient of reactivity due to the reduction in core inlet temperature from the steam generator 30. The core outlet temperature is maintained at a near constant temperature regulated by the pressure and saturation temperature of the steam dome volume 74'. Accordingly, for an increase in power, the temperature rise across the reactor core 10 increases while the reactor flow rate remains constant as determined by the reactor coolant pumps 26. Decreasing power employs analogous processes.

As another illustrative variation (not shown), the tubes of the OTSG can be placed in different locations within the pressure vessel. In the illustrative embodiments of FIGS. 1-3 and 6, the OTSG 30 including tubes 32 is disposed entirely in the downcomer volume 34. More generally, however, tubes may be disposed in the downcomer volume (as illustrated), or in the central riser flow path 38 inside the central riser 36, or in both volumes 34, 36.

As other illustrative variations, it has already been noted that the separate inner shroud 42 may instead be embodied as an outer surface of the central riser 36, and/or for the separate outer shroud 40 may instead be embodied as an inner surface of the upper portion 14 of the pressure vessel. Additionally, it is contemplated to integrate the lower tubesheet 92 with the mid-flange 16.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

We claim:

1. An apparatus comprising:
   a generally cylindrical pressure vessel defining a cylinder axis;
   a nuclear reactor core disposed in the generally cylindrical pressure vessel;
   a central riser disposed coaxially inside the generally cylindrical pressure vessel, the central riser being hollow and having a bottom end proximate to the nuclear reactor core to receive primary coolant heated by the nuclear reactor core, the central riser having a top end distal from the nuclear reactor core;
   a feedwater inlet comprising a vessel penetration of the generally cylindrical pressure vessel;
   a steam outlet comprising a vessel penetration of the generally cylindrical pressure vessel; and
   a once-through steam generator (OTSG) comprising tubes arranged parallel with the cylinder axis in an annular volume defined between the central riser and the generally cylindrical pressure vessel, primary coolant discharged from the top end of the central riser flowing inside the tubes toward the nuclear reactor core, the OTSG further including a fluid flow volume in fluid communication with the feedwater inlet and with the steam outlet wherein fluid injected into the fluid flow volume at the feedwater inlet and discharged from the fluid flow volume at the steam outlet flows outside the tubes in a direction generally opposite flow of primary coolant inside the tubes;
   wherein a feedwater annular space is defined between an outer shroud of the OTSG and the pressure vessel, the fluid flow volume at being in fluid communication with the feedwater inlet via the feedwater annular space; and
   wherein a steam annular space is defined between the outer shroud of the OTSG and the pressure vessel, the fluid flow volume at being in fluid communication with the steam outlet via the steam annular space;
   wherein the feedwater annular space has a larger outer diameter than the steam annular space.

2. The apparatus as set forth in claim 1, wherein the outer shroud of the OTSG comprises a cylindrical outer shroud having a constant outer diameter, the feedwater annular space and the steam annular space having the same inner diameter defined by the constant outer diameter of the cylindrical outer shroud of the OTSG.

3. The apparatus as set forth in claim 1, wherein the apparatus comprises a nuclear reactor having an operating state in which fluid comprising feedwater injected into the fluid flow volume at the feedwater inlet passes through the feedwater annular space into the fluid flow volume where the feedwater is converted by heat transfer from primary coolant flowing inside the tubes into steam that is discharged from the fluid flow volume at the steam outlet after passing through the steam annular space.

4. The apparatus as set forth in claim 3, wherein in the operating state the OTSG defines an integral economizer that heats feedwater injected into the fluid flow volume at the feedwater inlet to a temperature at or below a boiling point of the feedwater.

5. The apparatus as set forth in claim 3, further comprising:
   a flow diverter disposed in the generally cylindrical pressure vessel, the flow diverter having a flow-diverting surface facing the top end of the central riser that is at least one of sloped and curved to redirect primary coolant discharged from the top end of the central riser toward inlets of the tubes of the OTSG.

6. The apparatus as set forth in claim 3, further comprising:
   A perforated cylinder flow diverter disposed in the generally cylindrical pressure vessel, wherein the perforated cylinder flow diverter extends vertically from an upper portion of the central riser.

7. The apparatus as set forth in claim 3, further comprising:
   a divider plate spaced apart from the top end of the central riser;
   wherein the generally cylindrical pressure vessel includes a sealing top portion that together with the divider plate defines an integral pressurizer volume that is separated by the divider plate from the remaining interior volume of the generally cylindrical pressure vessel; and
   wherein in the operating state of the nuclear reactor comprises a pressurized water reactor (PWR) and the integral pressurizer volume contains fluid at a temperature greater than a temperature of the primary coolant disposed in the remaining interior volume of the generally cylindrical pressure vessel.

8. The apparatus as set forth in claim 7, wherein the divider plate comprises:
   a flow diverter having a flow-diverting surface facing the top end of the central riser that is at least one of sloped and curved to redirect primary coolant discharged from the top end of the central riser toward inlets of the tubes of the OTSG.

9. The apparatus as set forth in claim 7, further comprising:
   neutron-absorbing control rods; and
   a control rod drive mechanism (CRDM) configured to controllably insert and withdraw the control rods into and out of the nuclear reactor core;
   wherein no portion of the CRDM is disposed in or passes though the integral pressurizer volume.

10. The apparatus as set forth in claim 3, wherein:
    in the operating state of the nuclear reactor the primary coolant flowing inside the tubes is at a higher pressure than the fluid in the fluid flow volume.

11. The apparatus as set forth in claim 3, wherein:
    in the operating state of the nuclear reactor the primary coolant flowing inside the tubes is at a pressure that is at least twice a pressure of the fluid in the fluid flow volume.

12. An apparatus comprising:
    a pressurized water nuclear reactor (PWR) including a pressure vessel, a nuclear reactor core disposed in the pressure vessel, and a vertically oriented hollow central riser disposed above the nuclear reactor core inside the pressure vessel;
    a once-through steam generator (OTSG) disposed in the pressure vessel of the PWR, the OTSG including vertical tubes arranged in an annular volume defined between the central riser and the pressure vessel, the OTSG further including a fluid flow volume surrounding the vertical tubes, the OTSG further including an outer shroud surrounding vertical tubes of the OTSG arranged in the annular volume defined between the central riser and the pressure vessel;

a feedwater inlet comprising a vessel penetration of the pressure vessel; and a steam outlet comprising a vessel penetration of the pressure vessel;

wherein a feedwater annular space is defined between the outer shroud of the OTSG and the pressure vessel, and feedwater injected at the feedwater inlet passes through the feedwater annular space into the fluid flow volume, and wherein a steam annular space is defined between the outer shroud of the OTSG and the pressure vessel, and steam discharged from the fluid flow volume passes through the steam annular space and exits at the steam outlet.

13. The apparatus as set forth in claim 12 wherein the feedwater annular space has a larger outer diameter than the steam annular space.

* * * * *